United States Patent
Crounse et al.

(10) Patent No.: US 11,656,523 B2
(45) Date of Patent: May 23, 2023

(54) REFLECTIVE ELECTROPHORETIC DISPLAYS INCLUDING PHOTO-LUMINESCENT MATERIAL AND COLOR FILTER ARRAYS

(71) Applicant: E INK CORPORATION, Billerica, MA (US)

(72) Inventors: Kenneth R. Crounse, Somerville, MA (US); Stephen J. Telfer, Arlington, MA (US); Dirk Hertel, Quincy, MA (US)

(73) Assignee: E Ink Corporation, Billerica, MA (US)

( * ) Notice: Subject to any disclaimer, the term of this patent is extended or adjusted under 35 U.S.C. 154(b) by 92 days.

(21) Appl. No.: 17/461,078

(22) Filed: Sep. 24, 2021

(65) Prior Publication Data

US 2022/0004073 A1    Jan. 6, 2022

Related U.S. Application Data

(63) Continuation of application No. 16/281,530, filed on Feb. 21, 2019, now Pat. No. 11,143,929.

(60) Provisional application No. 62/640,813, filed on Mar. 9, 2018.

(51) Int. Cl.
*G02F 1/167* (2019.01)
*G02F 1/1676* (2019.01)
*G02F 1/1675* (2019.01)

(52) U.S. Cl.
CPC ............ *G02F 1/167* (2013.01); *G02F 1/1676* (2019.01); *G02F 2001/1678* (2013.01); *G02F 2203/02* (2013.01)

(58) Field of Classification Search
CPC ............... G02F 1/167; G02F 1/1676; G02F 2001/1678; G02F 2203/02

USPC .......................................... 359/241, 245, 296
See application file for complete search history.

(56) References Cited

U.S. PATENT DOCUMENTS

| | | | |
|---|---|---|---|
| 4,418,346 | A | 11/1983 | Batchelder |
| 5,760,761 | A | 6/1998 | Sheridon |
| 5,777,782 | A | 7/1998 | Sheridon |
| 5,808,783 | A | 9/1998 | Crowley |
| 5,872,552 | A | 2/1999 | Gordon, II et al. |

(Continued)

OTHER PUBLICATIONS

Wood, D., "An Electrochromic Renaissance?" Information Display, 18(3), 24 (Mar. 2002).

(Continued)

*Primary Examiner* — William Choi
(74) *Attorney, Agent, or Firm* — Brian D. Bean

(57) ABSTRACT

An electro-optic display is provided that may include a layer of light-transmissive conductive material, a substrate, a layer of an electro-optic medium disposed between the layer of conductive material and the substrate, a color filter array, and a light emitting layer. The electro-optic medium may include a photo-luminescent material that functions as either a down-converter or an up-converter that may be excited by the light received from the light emitting layer. The photo-luminescent material may be excited by radiation having a first wavelength transmitted by a filter within the color filter array and emit radiation having a second wavelength transmitted by the filter. The photo-luminescent material may also be excited by radiation at a wavelength within a first and second range of wavelengths transmitted by two filters within the color filter array and emit radiation at a wavelength within one of the first and second ranges.

13 Claims, 5 Drawing Sheets

(56) References Cited

U.S. PATENT DOCUMENTS

| | | |
|---|---|---|
| 6,017,584 A | 1/2000 | Albert et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,545,797 B2 | 4/2003 | Chen et al. |
| 6,664,944 B1 | 12/2003 | Albert et al. |
| 6,788,452 B2 | 9/2004 | Liang et al. |
| 6,825,829 B1 | 11/2004 | Albert et al. |
| 6,866,760 B2 | 3/2005 | Paolini, Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,072,095 B2 | 7/2006 | Liang et al. |
| 7,075,502 B1 | 7/2006 | Drzaic et al. |
| 7,112,114 B2 | 9/2006 | Liang et al. |
| 7,116,318 B2 | 10/2006 | Amundson et al. |
| 7,144,942 B2 | 12/2006 | Zang et al. |
| 7,158,282 B2 | 1/2007 | Liang et al. |
| 7,167,155 B1 | 1/2007 | Albert et al. |
| 7,170,670 B2 | 1/2007 | Webber |
| 7,236,291 B2 | 6/2007 | Kaga et al. |
| 7,312,784 B2 | 12/2007 | Baucom et al. |
| 7,321,459 B2 | 1/2008 | Masuda et al. |
| 7,339,715 B2 | 3/2008 | Webber et al. |
| 7,385,751 B2 | 6/2008 | Chen et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,505 B2 | 2/2009 | Liang et al. |
| 7,513,813 B2 | 4/2009 | Paolini, Jr. et al. |
| 7,535,624 B2 | 5/2009 | Amundson et al. |
| 7,561,324 B2 | 7/2009 | Duthaler et al. |
| 7,636,191 B2 | 12/2009 | Duthaler et al. |
| 7,649,666 B2 | 1/2010 | Isobe et al. |
| 7,667,684 B2 | 2/2010 | Jacobson et al. |
| 7,679,814 B2 | 3/2010 | Paolini, Jr. et al. |
| 7,715,088 B2 | 5/2010 | Liang et al. |
| 7,728,811 B2 | 6/2010 | Albert et al. |
| 7,800,813 B2 | 9/2010 | Wu et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,910,175 B2 | 3/2011 | Webber |
| 7,952,790 B2 | 5/2011 | Honeyman et al. |
| 7,956,841 B2 | 6/2011 | Albert et al. |
| 7,982,941 B2 | 7/2011 | Lin et al. |
| 8,009,348 B2 | 8/2011 | Zehner et al. |
| 8,034,209 B2 | 10/2011 | Danner et al. |
| 8,040,594 B2 | 10/2011 | Paolini, Jr. et al. |
| 8,054,526 B2 | 11/2011 | Bouchard |
| 8,098,418 B2 | 1/2012 | Paolini, Jr. et al. |
| 8,159,636 B2 | 4/2012 | Sun et al. |
| 8,177,942 B2 | 5/2012 | Paolini, Jr. et al. |
| 8,363,299 B2 | 1/2013 | Paolini, Jr. et al. |
| 8,390,301 B2 | 3/2013 | Danner et al. |
| 8,422,116 B2 | 4/2013 | Sprague et al. |
| 8,451,402 B2 | 5/2013 | Oshima et al. |
| 8,503,063 B2 | 8/2013 | Sprague |
| 8,576,470 B2 | 11/2013 | Paolini, Jr. et al. |
| 8,576,475 B2 | 11/2013 | Huang et al. |
| 8,605,354 B2 | 12/2013 | Zhang et al. |
| 8,649,084 B2 | 2/2014 | Wang et al. |
| 8,670,174 B2 | 3/2014 | Sprague et al. |
| 8,704,756 B2 | 4/2014 | Lin |
| 8,717,664 B2 | 5/2014 | Wang et al. |
| 8,786,935 B2 | 7/2014 | Sprague |
| 8,797,634 B2 | 8/2014 | Paolini, Jr. et al. |
| 8,830,553 B2 | 9/2014 | Patry et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,964,282 B2 | 2/2015 | Wang et al. |
| 9,013,783 B2 | 4/2015 | Sprague |
| 9,116,412 B2 | 8/2015 | Lin |
| 9,146,439 B2 | 9/2015 | Zhang |
| 9,170,468 B2 | 10/2015 | Lin et al. |
| 9,195,111 B2 | 11/2015 | Anseth et al. |
| 9,199,441 B2 | 12/2015 | Danner |
| 9,238,340 B2 | 1/2016 | Kayal et al. |
| 9,279,906 B2 | 3/2016 | Kang |
| 9,285,649 B2 | 3/2016 | Du et al. |
| 9,341,916 B2 | 5/2016 | Telfer et al. |
| 9,360,733 B2 | 6/2016 | Wang et al. |
| 9,361,836 B1 | 6/2016 | Telfer et al. |
| 9,383,623 B2 | 7/2016 | Lin et al. |
| 9,423,666 B2 | 8/2016 | Wang et al. |
| 9,459,510 B2 | 10/2016 | Lin |
| 9,513,527 B2 | 12/2016 | Chan et al. |
| 9,541,814 B2 | 1/2017 | Lin et al. |
| 9,671,668 B2 | 6/2017 | Chan et al. |
| 9,697,778 B2 | 7/2017 | Telfer et al. |
| 9,759,980 B2 | 9/2017 | Du et al. |
| 9,812,073 B2 | 11/2017 | Lin et al. |
| 10,078,977 B2 | 9/2018 | Atkinson et al. |
| 10,162,242 B2 | 12/2018 | Wang et al. |
| 10,209,556 B2 | 2/2019 | Rosenfeld et al. |
| 10,444,553 B2 | 10/2019 | Laxton |
| 10,591,774 B2 | 3/2020 | Drolet et al. |
| 2007/0237962 A1 | 10/2007 | Liang et al. |
| 2008/0043318 A1 | 2/2008 | Whitesides et al. |
| 2010/0156780 A1 | 6/2010 | Jacobson et al. |
| 2011/0043543 A1 | 2/2011 | Chen et al. |
| 2011/0164301 A1 | 7/2011 | Paolini, Jr. et al. |
| 2014/0055840 A1 | 2/2014 | Zang et al. |
| 2014/0078576 A1 | 3/2014 | Sprague |
| 2014/0362213 A1 | 12/2014 | Tseng |
| 2015/0005720 A1 | 1/2015 | Zang |
| 2015/0268531 A1 | 9/2015 | Wang et al. |
| 2015/0301246 A1 | 10/2015 | Zang et al. |
| 2016/0012710 A1 | 1/2016 | Lu et al. |
| 2018/0081096 A1 | 3/2018 | Claes |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Heikenfeld, J. et al., "A critical review of the present and future prospects for electronic paper", SID, 19(2), pp. 129-156 (2011).

Rodriguez-Pardo, Carlos Eduardo et al., "Optimal gamut volume design for three primary and multiprimary display systems", SPIE

(56) References Cited

OTHER PUBLICATIONS

Proceedings, vol. 8292, Color Imaging XVII: Displaying, Processing, Hardcopy, and Applications; 82920C, (Jan. 24, 2012).
Heikenfeld, J. et al., "A Critical and Current Review of the Present and Future Prospects for e-Paper", SID Seminar M-12 (2014), Campbell, CA, USA.
So, Woo-Young et al., "21.3: Power Efficient RGBW AMOLED Displays Incorporating Color-Down-Conversion Layers", SID Digest, vol. 43, Issue 1, pp. 282-285 (Oct. 1, 2012).
Teitelboim, Ayelet et al., "Broadband Near-Infrared to Visible Upconversion in Quantum Dot-Quantum Well Heterostructures", ACS Nano, 10(1), pp. 446-452 (2016).

REFLECTIVE ELECTROPHORETIC DISPLAYS INCLUDING PHOTO-LUMINESCENT MATERIAL AND COLOR FILTER ARRAYS

CROSS-REFERENCE TO RELATED APPLICATION

This application is a continuation of U.S. patent application Ser. No. 16/281,530, filed Feb. 21, 2019, which claims priority to and the benefit of U.S. Provisional Application Ser. No. 62/640,813, filed on Mar. 9, 2018. All patents and publications disclosed herein are incorporated by reference herein in their entireties.

FIELD OF THE INVENTION

This invention relates to reflective displays that include layers of electrophoretic media containing photo-luminescent material and color filter arrays.

BACKGROUND OF INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; and 9,238,340; and U.S. Patent Applications Publication Nos. 2007/0237962; 2009/0109519; 2009/0168067; 2011/0164301; 2014/0115884; and 2014/0340738;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Many types of electro-optic media are essentially monochrome, in the sense that any given medium has two extreme optical states and a range of gray levels lying between the two extreme optical states. However, there is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

The position of the color filter array (CFA) relative to the electro-optic medium in the optical stack can vary widely, but must take into account the type of electro-optic medium used and, in some cases, the properties of other layers of the optical stack. Color displays using CFA's can be broadly divided into two classes, namely front CFA displays (in which the CFA lies between the electro-optic medium and the viewing surface through which an observer views the display) and rear CFA displays (in which the CFA lies on the opposed side of the electro-optic medium from the viewing surface). If the electro-optic medium used is transmissive (i.e., light, typically from a backlight, passes through the electro-optic medium, which acts as a light valve controlling the amount of light which passes through each pixel, and then emerges from the viewing surface), the CFA can occupy any position in the optical stack, since regardless of the position of the CFA, light will pass through both the CFA and the electro-optic medium. Thus, both front and rear CFAs can be used with transmissive electro-optic media, although the former are probably more common.

Front CFA displays suffer from the disadvantage that color filter arrays inherently absorb light, and the overall effect of the absorption of light by a front CFA is a darkening of the white state of the display. A front CFA also can exhibit unwanted reflection, for example by scattering, and the overall effect of the reflection of light by a front CFA is a slight desaturation of displayed colors. For example consider a front CFA display in which the color filter comprises regions of equal area that pass red, green, blue and white light, respectively (a RGBW display). The result is an absorption by the CFA of, in principle, 50% of light that could have been reflected from the display in the white state. Moreover if, for example, a particular primary color is intended to be displayed at maximum saturation, it is necessary for the display be switched to absorb light in all regions except those behind the particular CFA element corresponding to the desired color, so that only 25% of the total area of the display is available for display of a particular primary color. This results in a gamut of rather dark colors. In order to allow more light to pass, spectrally broad color filters may be selected; however, this will come at the cost of colorfulness, i.e. color saturation.

Accordingly, there is a need for improved electro-optic displays that utilize CFAs.

SUMMARY OF THE INVENTION

According to a first aspect of the present invention, an electro-optic display is provided that may comprise a layer of light-transmissive conductive material, a substrate, a layer of an electro-optic medium disposed between the layer of light-transmissive conductive material and the substrate, the electro-optic medium comprising a photo-luminescent material, and a color filter array. The photo-luminescent material may be excited by radiation at a first wavelength and emit radiation at a second wavelength, the second wavelength being either longer or shorter than the first wavelength.

According to another aspect of the present invention, an electro-optic display is provided that may comprise a layer of light-transmissive conductive material, a substrate, a layer of an electro-optic medium disposed between the layer of light-transmissive conductive material and the substrate, and a color filter array comprising a first color filter configured to transmit radiation within a first range of wavelengths and a second color filter configured to transmit radiation with a second range of wavelengths. The photo-luminescent material may be excited by radiation at a wavelength within both of the first and second ranges and emit radiation at a wavelength within one of the first and second ranges.

These and other aspects of the present invention will be apparent in view of the following description.

BRIEF DESCRIPTION OF THE FIGURES

The drawing Figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention may provide an electro-optic display that includes a color filter array and an electro-optic medium comprising a photo-luminescent material that functions as a down-converter or an up-converter. As used throughout the specification and the claims, a "down-converter" means a photo-luminescent substance that absorbs photons and then re-emits them at a typically lower energy, i.e. frequency. As used throughout the specification and the claims, an "up-converter" means a photo-luminescent substance that absorbs two photons and then re-emits a single photon at a higher energy, i.e. frequency.

One or more down-converters or up-converters may be incorporated in the electro-optic medium of the color display for the purpose of shifting incident light from wavelengths of less sensitivity of the human visual system to those of greater sensitivity, to shift from wavelengths that are in overlapping ranges of wavelengths of radiation transmitted by two filters within a CFA into a range of wavelengths of radiation transmitted by one of the two filters, to sharpen the spectral response of a filter by shifting from a lower wavelength part of a range where the CFA transmits radiation to a higher wavelength part, and/or to shift the spectral peak of a within a range of wavelengths of radiation transmitted by a filter to a different peak that leads to a more optimal combination of color primaries.

Figure 1:
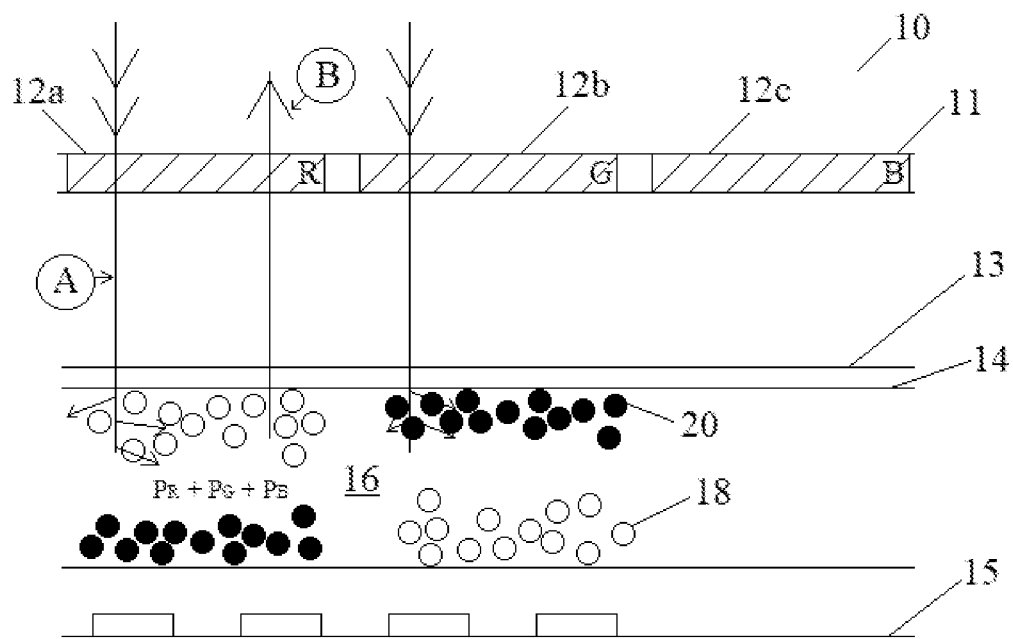
FIG. 1 is a cross-section side view of a schematic of a reflective display according to a first embodiment of the present invention.

Referring now to FIG. 1, a reflective display 10 is illustrated according to a first embodiment of the present invention. The reflective display 10 may comprise a color filter array 11 having a plurality of different color filters, such as a red filter 12a, green filter 12b, and blue filter 12c, for example. Laminated below the color filter array 11 is a light transmissive conductive layer 13 and a layer of electro-optic media 14, preferably in the form of a dispersion 16 comprising electrophoretic particles, such as white particles 18 and black particles 20. A substrate 15 below the layer of electro-optic media 14 may include a plurality of electrodes used to drive the particles 18, 20 between a light state in which the white particles 18 are driven to the viewing side of the display and a dark state in which the black particles 20 are driven to the viewing side of the display. The dispersion fluid, in addition to containing electrophoretic particles, may further comprise one or more types of photo-luminescent materials ($P_R$, $P_G$, $P_B$). In a dark state, the reflection of ambient light (A) transmitted through the color filter array 11 is prevented by the black particles 20. In a light state, ambient light (A) transmitted through the color filter array 11 is reflected off of white particles 18 and absorbed by any photo-luminescent material ($P_R$, $P_G$, $P_B$) and re-emitted. The sum of the reflected and emitted light (B) passes back through the color filter array 11 back to the viewer.

In a most preferred embodiment of an electrophoretic display comprising a color filter array according to the present invention, charged white particles of electrophoretic dispersion may comprise the photo-luminescent material. In a less preferred embodiment, the photo-luminescent material may be incorporated into the dispersion fluid and/or in non-charged white particles of a dispersion. In a least preferred embodiment, the photo-luminescent material may be incorporated into the dispersion fluid that further comprises charged white particles. The display made according to the present invention may include one type of dispersion fluid. Alternatively, a display may having a plurality of formulations, wherein each formulation may have different combinations of photo-luminescent material on a per-pixel basis, i.e. the dispersion formulation within the viewing area of one color filter may differ from the dispersion formulation within the area of a different color filter.

The photo-luminescent material may comprise one or more phosphorescent materials, fluorescent materials, quantum dots, up-converter nanoparticles, or combinations thereof, such as those described in "Phosphors, Up Conversion Nano Particles, Quantum Dots and Their Applications" Vol. 1 by Ru-Shi Liu (2017), the content of which is incorporated by reference herein in its entirety. The photo-luminescent materials preferably have narrow excitation spectra, preferably between 50-100 nm full width at half maximum (FWHM), and narrow emission spectra (<100 nm FWHM), with high quantum yields of 50% to more than 90%, and a lifetime of less than 100 ms. As used herein throughout the specification and the claims, the "excitation spectrum" is the absorptance as a function of wavelength at which photons are absorbed, the "emission spectrum" is the normalized energy emitted per wavelength, the "lifetime" is the average time between absorption and emission, and the "quantum yield" is the efficiency of the energy transfer from absorption to re-emission.

Examples of photo-luminescent materials that may be incorporated into the various embodiments of the present invention include, but are not limited to, N-hydroxysuccinimidyl (NHS) esters, such as DyLight® 405, DyLight® 488, DyLight™ 549, DyLight® 649, DyLight® 680, and DyLight® 800 manufactured and sold by Thermo Fisher Scientific Inc. of Waltham, Mass., aminomethylcoumarin (AMCA), ATTO 425, ATTO 488, ATTO 594, ATTO 532, ATTO 550, ATTO 647N, and ATTO 655 manufactured and sold by Atto-Tec GmbH of Siegen, Germany, cyanine dyes, such as Cy2, Cy3, Cy3.5, Cy5, Cy5.5, fluorescein, tetraymethyl rhodamine (TRITC), R-phycoerythrin (RPE), sulforhodamine 101 acid chloride (Texas Red), and allophycocyanin. Upconverting nanoparticles include, but are not limited to, rare earth doped nanocrystals, consisting of a transparent matrix, for example fluorides, such as $NaYF_4$, $NaGdF_4$, $LiYF_4$, $YF_3$, $CaF_2$, or oxides, such as $Gd_2O_3$, doped with a combination of a trivalent rare-earth sensitizer (e.g. Yb, Nd, Er, or Sm) to absorb NIR radiation and a second lanthanide activator (e.g. Er, Ho, Pr, Tm) ion serving as emitter, manufactured and sold as Sunstone® Upconverting Nanocrystals by Sigma-Aldrich, Inc. of St. Louis, Mo. An alternative class of up-converting materials are semiconducting core-shell nanoparticles with quantum dot-quantum well heterostructures, including, but not limited to, PbSe core/CdSe shell nanodots [Ayelet Teitelboim and Dan Oron, Broadband Near-Infrared to Visible Upconversion in Quantum Dot-Quantum Well Heterostructures, ACS Nano 2016 10 (1), 446-452, DOI: 10.1021/acsnano.5b05329].

According to a first embodiment of the present invention, an electro-optic display may comprise an electrophoretic fluid containing at least one photo-luminescent material, such as a downconverter, that absorbs radiation at or below about 425 nm (i.e. violet-near UV) and emit light that may be sensed by the human visual system. Often electrophoretic displays include protective UV coatings to protect the underlying layers from damage. If the various embodiments of the present invention include an optional UV protective coating, the photo-luminescent material may be capable of emitting light after absorbing radiation of a wavelength that is less than or equal to about 425 nm (i.e. violet-near UV) and greater than or equal to the wavelength of radiation that is able to successfully pass through the UV protective coating.

Figure 2:
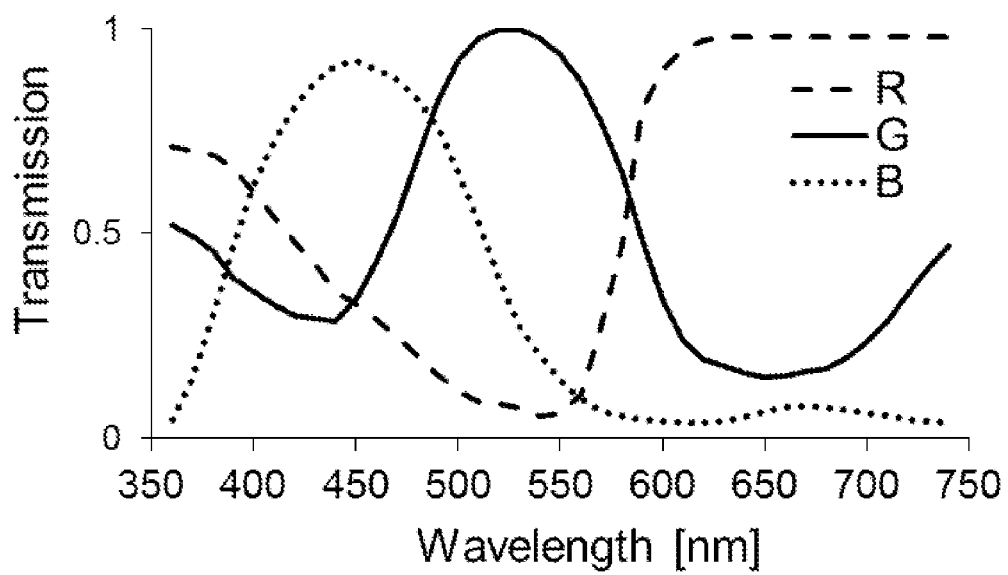
FIG. 2 is a graph of the transmittance of radiation at various wavelengths of a color filter array having red, blue, and, green filters that may be incorporated in one embodiment of the present invention.

In one example of the first embodiment, an electrophoretic display may include a color filter array that includes a red, blue, and green filter and an optional UV filter. The UV filters may allow the transmission of some radiation at or below about 425 nm. If the color filter array includes filters that allow significant transmission in this range, such as a color filter array that exhibits a transmission graphically represented in FIG. 2, a downconverter which absorbs violet and/or near-UV radiation and emits radiation within the visible spectrum for humans may be incorporated in the electrophoretic fluid of the display.

If the selected fluorescent material converts violet light to red light, this would have the effect, for example, of both eliminating the violet contamination of the red pixels (resulting from inefficient absorption of violet light by the red color filter) and increasing the apparent brightness of the display (since the human visual system is more sensitive to red than to violet light). In another example, the downconverter after absorbing radiation at or below about 425 nm (i.e. violet/near UV) may emit radiation at or about 450 nm (i.e. blue light). By this means, the perceived brightness of the blue light would be increased.

According to a second embodiment of the present invention, an electro-optic display may comprise a color filter array and an electrophoretic fluid containing a photo-luminescent material, such as a downconverter, that absorbs radiation at a wavelength that may be transmitted by two filters within the color filter array and emit radiation at a wavelength that is substantially transmitted by only one of the two filters.

Referring again to FIG. 2, a color filter array included in an electro-optic display may have filters that each transmit a range of radiation wavelengths and a portion of each range of respective filters may overlap, such as the transmitted spectra for the blue and green filters around 490 nm, for example, and the green and red filters around 590 nm, for example. In one example of the second embodiment described above, the electrophoretic fluid may include a downconverter that is excited by radiation at a first wavelength within a range of wavelengths common to the two filters and emit radiation at a second wavelength outside of the range, for example, a wavelength at which one of the filters transmits little to no light. In one example a down converter may be excited at or around 490 nm, such as 470 to 520 nm, (i.e. between green and blue) and have an emission peak around 550 nm, such as 520 to 560 nm) (i.e. green). Alternatively in another example of the second embodiment described above, the electrophoretic fluid may include a downconverter that absorbs radiation around 590 nm, such as 560 to 635 nm, (i.e. between green and red) that has an emission peak around 650 nm, such as 635 to 700 nm (i.e. red).

Figure 3A:
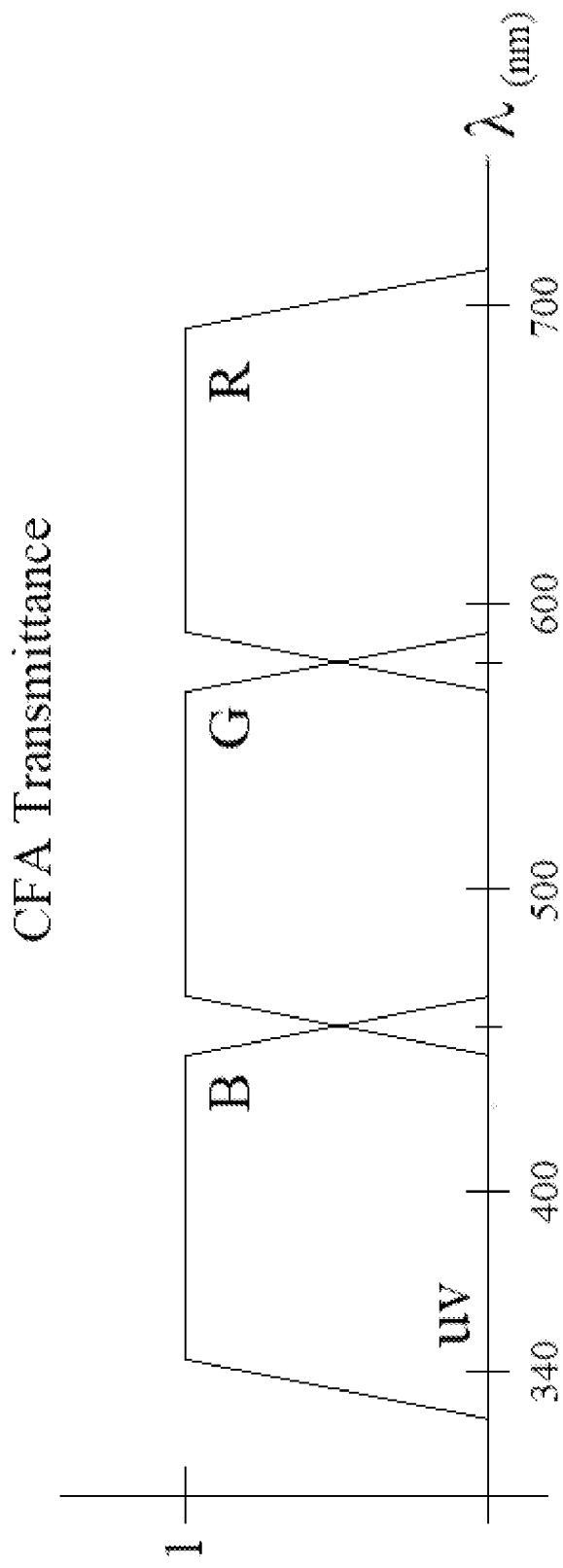
FIGS. 3A to 3C are graphs illustrating the color filter array transmittance, emission and excitation spectra of photo-luminescent material, and returned spectra of a prophetic example of a reflective display according to another embodiment of the invention.
Figure 3B:
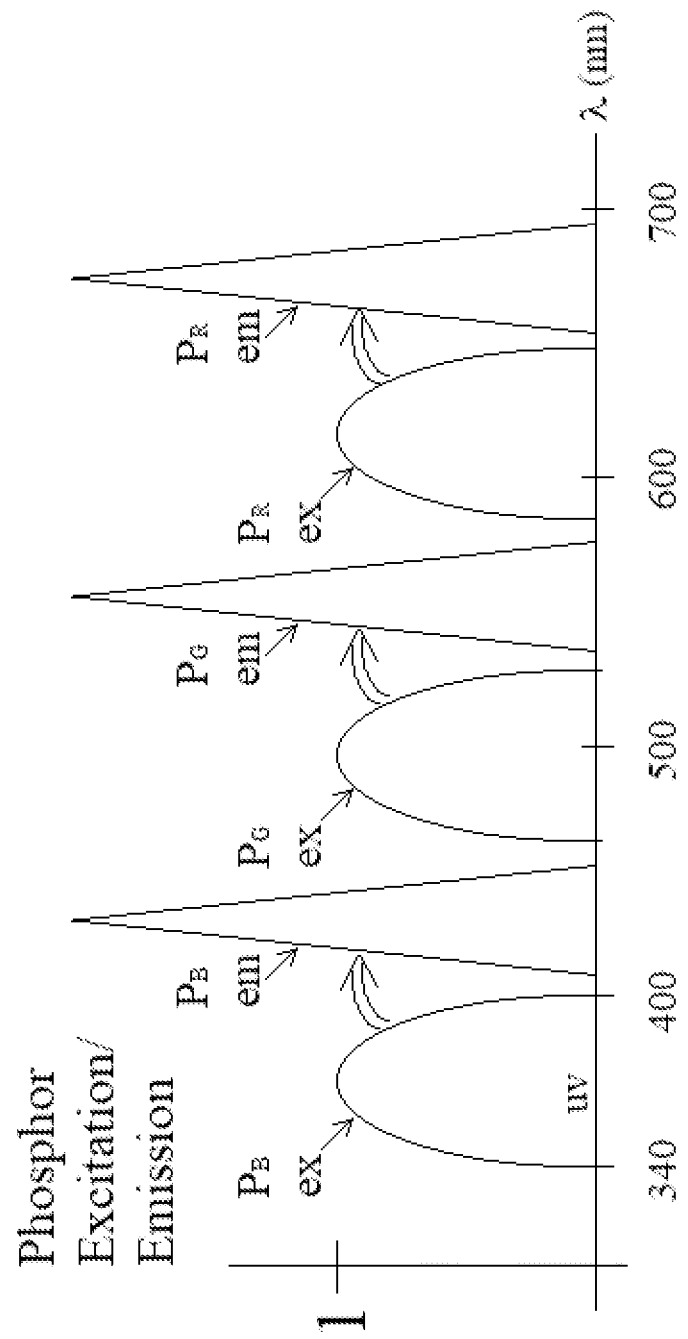
Figure 3C:
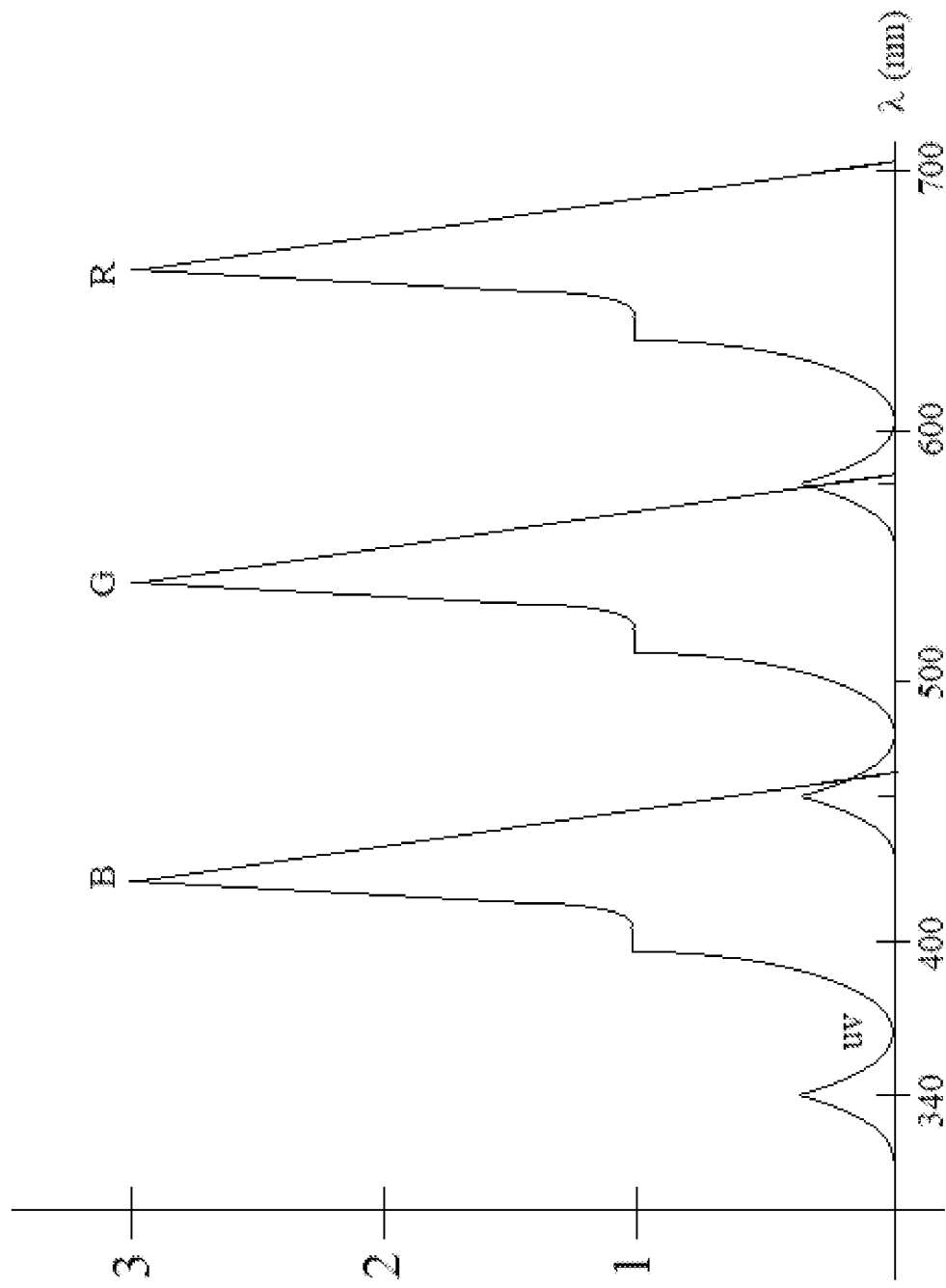

According to a third embodiment of the present invention, an electro-optic display may comprise a color filter array and an electrophoretic fluid containing a photo-luminescent material, such as a downconverter, that absorbs radiation having a first wavelength that is transmitted by a filter within the color filter array and emit radiation having a second wavelength that is transmitted by the filter, the second wavelength being longer than the first wavelength. By this means the total light energy may be conserved (in the perfect quantum yield case), but the reflected spectrum associated with each color filter may be sharpened, as illustrated in FIGS. 3A to 3C, which is a prophetic example of a reflective display according to the third embodiment of the invention.

Figure 4:
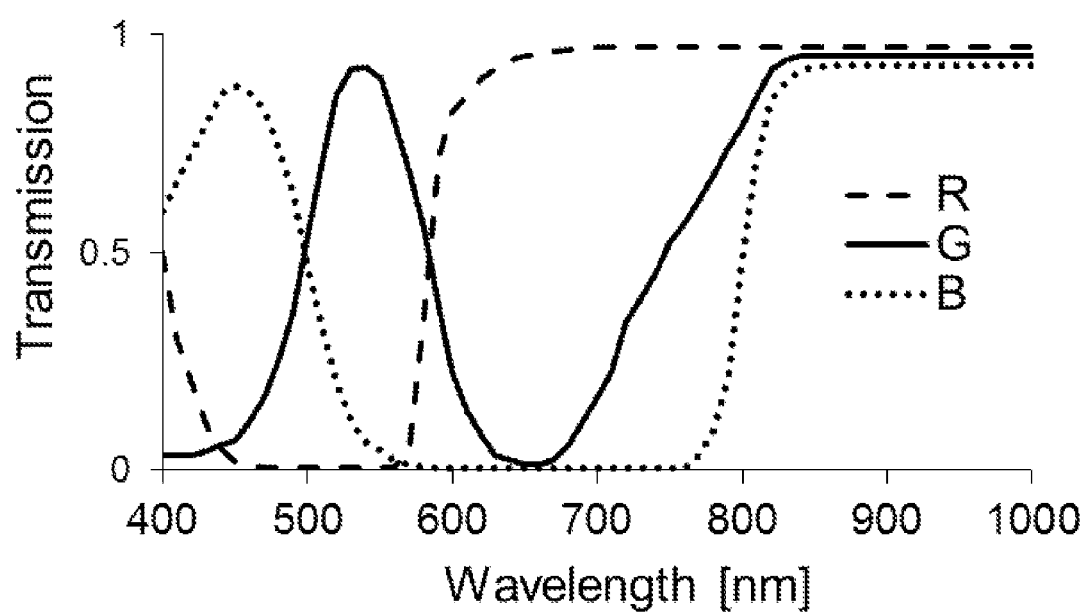
FIG. 4 is a graph of the transmittance of radiation at wavelengths extended into the near-infrared of a color filter array having red, blue, and, green filters that may be incorporated in yet another embodiment of the present invention.

According to a fourth embodiment of the present invention, an electro-optic display may comprise a color filter array and an electrophoretic fluid containing a photo-luminescent material, such as an up-converter, that absorbs radiation having a first wavelength that is transmitted by a filter within the color filter array and emit radiation at a second wavelength that is transmitted by the filter, the second wavelength being shorter than the first wavelength. For example, a photo-luminescent material, such as an up-converter nanoparticle, may be excited by infrared radiation (e.g. radiation having a wavelength greater than about 700 nm) and emit radiation at a wavelength below about 700 nm, preferably visible light. This may take advantage of a color filter array comprising filters having a high transmittance in the near-infrared range of the spectrum, as illustrated in FIG. 4. However, it should be noted that current state of the art up-converting materials may require high irradiance to function efficiently.

According to a fifth embodiment of the present invention each of the embodiments described above may be combined with a light emitting layer. The light emitting layer incorporated into the reflective display may emit UV, visible, or IR light. Reflective displays according to the present invention may be used indoors or outdoors. For indoor applications, for example, a light emitting layer may be incorporated into the reflective display to provide a constant, environment-independent supply of radiation having the necessary wavelength and intensity to excite the photo-luminescent material. For ambient illumination, the amount of UV (and to a lesser degree of NIR) is highly dependent on the lighting environment. For example, windows in buildings and vehicles will cut UV, and also NIR if they are of the energy-efficient type. Incandescent and fluorescent lighting might not have enough UV to excite the photo-luminescent material in a reflective display according to some embodiments of the invention. Similarly, the low end of the spectrum of LED lamps is generally at about 410 nm, which may not be an adequate wavelength depending on the selected photo-luminescent material. Thus, incorporating a light emitting layer into a reflective display according to the present invention may allow for a more constant performance that is independent of the quality of the surrounding light.

Referring again to FIG. 1, the light emitting layer may be incorporated into the display, such that the layer of electro-optic medium receives light emitted by the light emitting layer and excites the photo-luminescent material present in the electro-optic medium. For example, the light emitting layer may be located above the color filter array 11, such that the color filter array 11 is between the light emitting layer and the layer of electro-optic medium 14. Alternatively, the light emitting layer may be placed between the color filter array 11 and layer of electro-optic medium 14. As noted above, the light emitted by the light emitting layer may be tuned to the wavelength of light that will cause excitation of the photo-luminescent material in the electro-optic medium. In one example, if the light emitting layer is configured to emit UV or NIR radiation to excite the photo-luminescent material, the light will not be perceived by a viewer as "switched on" but its effect will be visible. Alternatively, the light emitting layer may emit visible light having a wavelength transmitted by one or more of the filters of the color filter array.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:
1. An electro-optic display comprising
a layer of light-transmissive conductive material,
a substrate,
a layer of an electro-optic medium disposed between the layer of light-transmissive conductive material and the substrate, the electro-optic medium comprising a photo-luminescent material, and
a color filter array,
wherein the photo-luminescent material is excited by radiation at a first wavelength and emits radiation at a second wavelength, the second wavelength being shorter than the first wavelength.

2. The electro-optic display of claim 1, wherein the photo-luminescent material absorbs light having a wavelength greater than 700 nm and emits visible light having a wavelength less than or equal to 700 nm.

3. The electro-optic display of claim 1, wherein the photo-luminescent material comprises a nanoparticle.

4. The electro-optic display of claim 1, wherein the color filter array is between the layer of light-transmissive conductive material and the layer of electro-optic material.

5. The electro-optic display of claim 1, wherein the color filter array is between the substrate and the layer of electro-optic material.

6. The electro-optic display of claim 1, wherein the substrate comprises a plurality of conductive electrodes.

7. The electro-optic display of claim 6, wherein the plurality of conductive electrodes form the color filter array.

8. The electro-optic display of claim 1, wherein the electro-optic medium further comprises a dispersion of electrophoretic particles in a non-polar solvent.

9. The electro-optic display of claim 8, wherein the electrophoretic particles comprises a plurality of black particles and a plurality of white particles.

10. The electro-optic display of claim 9, wherein the white particles comprise the photo-luminescent material.

11. The electro-optic display of claim 9, wherein the pluralities of black and white particles are charged and the black particles have a charge polarity that is opposite to a charge polarity of the white particles.

12. The electro-optic display of claim 9, wherein the charged white particles comprise the photo-luminescent material.

13. The electro-optic display of claim 1 further comprising a light emitting layer, wherein the display is configured such that the photo-luminescent material is excited by light emitted by the light emitting layer.

* * * * *